United States Patent [19] [11] 4,349,772
Weiss [45] Sep. 14, 1982

[54] METHOD AND APPARATUS FOR CONTROLLING AN ALTERNATING CURRENT MOTOR LOAD USING PLURAL CONTROLLED-CURRENT INVERTER CIRCUITS

[75] Inventor: Herbert W. Weiss, Salem, Va.

[73] Assignee: General Electric Company, Salem, Va.

[21] Appl. No.: 219,734

[22] Filed: Dec. 23, 1980

[51] Int. Cl.³ .............................................. H02P 5/40
[52] U.S. Cl. .................................... 318/799; 318/803; 318/798; 363/65; 363/71
[58] Field of Search ......................... 318/803, 807–812, 318/798, 799, 801, 806, 41, 44, 52, 77, 78, 85, 98, 99, 434; 363/70, 71, 72, 65; 307/43–45, 58, 82, 87, 85, 86

[56] References Cited
U.S. PATENT DOCUMENTS

| 2,623,203 | 12/1952 | Demuth | 363/71 |
| 3,381,205 | 4/1968 | Howell et al. | 363/72 |
| 3,781,616 | 12/1973 | Mokrytzki | 318/404 |
| 3,970,914 | 7/1976 | Salzmann et al. | 318/812 |

Primary Examiner—David Smith, Jr.
Attorney, Agent, or Firm—Arnold E. Renner; James H. Beusse

[57] ABSTRACT

A plurality of controlled current inverter circuits each including a plurality of electrical current conducting legs having controlled rectifiers and associated commutating capacitors are connected in parallel and individually controlled to collectively supply an alternating current motor load with electrical power. At high speed, low required torque conditions, less than the total number of inverter circuits are maintained operative to thereby maintain sufficient current within the effective inverter circuit or circuits to sustain effective inverter commutation.

8 Claims, 3 Drawing Figures

METHOD AND APPARATUS FOR CONTROLLING AN ALTERNATING CURRENT MOTOR LOAD USING PLURAL CONTROLLED-CURRENT INVERTER CIRCUITS

BACKGROUND OF THE INVENTION

The present invention relates generally to the control of an electric motor load and, more particularly, to the control of an alternating current motor load through the use of controlled-current inverter circuits.

One commonly used drive system for controlling an alternating current (AC) motor employs the autosequentially commutated current source inverter which is often and more commonly called the controlled-current inverter. In this type of drive, a variable voltage, direct current (DC) source supplies a controlled variable frequency inverter circuit through a DC link circuit. One form of inverter circuit in common use today employs gate controlled rectifiers (e.g., thyristors, the most common form of which is the silicon controlled rectifier or SCR) in a bridge arrangement for polyphase use. Capacitors, across which a voltage is developed, are used to commutate (turnoff) the thyristors at appropriate times so that the current in the inverter circuit (i.e., the load current) may be transferred from one thyristor to another to provide the AC output. Some finite time is required to effect the thyristor commutation and current transfer. This time although dependent upon a number of system constants and variables as will be discussed shortly, is in a large part dependent upon the interrelationship of the capacitance of the commutating capacitors and the value of the inverter or load current.

It is known that the maximum frequency which a controlled-current inverter system can attain is related to the time required for the commutation of the current from one leg of the inverter circuit to another leg in the commutating group of the inverter. The total time to effect this commutation is the sum of two times, $t_1$ and $t_2$, wherein:

$$t_1 = \frac{C(V_{ci} - E_m \sin \alpha)}{I_d} ; \text{ and} \quad (1)$$

$$t_2 = \frac{\pi}{2} \sqrt{LC} \quad (2)$$

wherein:
C = Capacitance of commutating capacitor
$V_{ci}$ = Initial voltage on the capacitor
$E_m$ = Peak motor counter electromotive force (CEMF)
$\alpha$ = Phase angle of rendering thyristors conductive (180 degrees to 270 degrees for motoring)
$I_d$ = Current being commutated, and,
L = Motor leakage reactance.

From equation (2) above, it is seen that the time $t_2$, once the commutating capacitance has been selected, is a constant for a given motor. Time $t_1$ is a variable dependent upon the voltages and current which exist within the system as shown by equation (1). From these equations, it is seen that the frequency limit for the drive is most severe at very low or zero torque when the current to the motor is the only magnetizing current being supplied to the motor. Thus, $t_1$ increases as the $I_d$ term in the denominator decreases and the numerator increases when $\alpha$ equals 270 degrees and the sin $\alpha = (-1)$. The remaining term in the numerator of equation (1) is the commutating capacitance C. This value is usually selected to satisfy another design criteria within the overall system, namely, the peak voltage in the circuit which is defined as:

$$V_c = I_d \sqrt{L/C} - E_m \sin \alpha. \quad (3)$$

In normal design, the value of C is selected at the maximum torque condition where $I_d$ is maximum to limit the value of $V_c$ to a value compatible with the power semiconductor voltage ratings and the motor insulation levels. Therefore, a drive system requiring high maximum torque and low torque at high speed presents a problem since both criteria must be satisfied by the same value (C) of the capacitor.

From the above it is seen that, basically, the larger the maximum current which must be commutated, the larger the capacitance required. Also, the larger the capacitance the greater the commutation time period. Since, however, as was indicated the capacitors are fixed once the inverter's design is fixed, it is readily seen that the system can become limited at its maximum frequency particularly during periods of light motor loads when the current is at a relatively low value. The use of larger capacitors necessary for heavy load conditions limits the operating frequency of the system particularly at light loads. Since the size of the capacitors also limits the permissible peak voltage of the system, capacitor selection normally involves some trade off between the maximum operating frequency and the peak voltages. This problem is well recognized in the industry and is explained in much greater detail in the literature. As examples, reference is made to "Transfer Function of a Controlled-Current Inverter With Purely Inductive Load" by William McMurray, Conference Record, *Industry Applications Society*, IEEE-IAS-1978, Annual Meeting, pages 546 to 549 and to "Commutation Modes of a Current-Source Inverter" by W. Lienau, *Control in Electronics and Electrical Drives*, 2nd IFAC Symposium, Copyright 1977, pages 219-299 (Pergamon Press).

In the prior art, a number of schemes have been proposed and used to increase the maximum operating frequency of a controlled current inverter drive system. In at least a majority of these cases, the net effect was to decrease the amount of time required for commutation. Known methods for achieving this function include reset circuits used to create an additional current during the commutation interval, which current does not pass through the motor. This method requires additional circuit components to handle the reset currents and an example of this method is found in U.S. Pat. No. 3,733,543 "Adjustable Frequency Current Source Power Supply of the Inverter Type" by Charles E. Rettig, issued May 15, 1973. Another method is to clamp or limit the voltage on the commutating capacitors. This permits the commutating capacitor to be relatively small to reduce the commutation time but also requires additional components to absorb the commutation energy when the capacitor voltage is clamped. It is additionally known to add an inductive load in parallel with the motor load during periods of high speed, light load operation to thus increase the inverter current and hence reduce the commutation time. Once again, additional components are required to switch the additional load into and out of the circuit at appropriate times.

SUMMARY OF THE INVENTION

It is, therefore, an object of the present invention to provide an apparatus and method for controlling an alternating current motor through the use of parallel connected controlled-current inverter circuits.

It is a further object to provide a controlled-current inverter motor drive system which permits high speed motor operation under low load conditions.

Another object is to provide an apparatus and method for controlling an alternating current motor through the use of parallel connected controlled-current inverter circuits which apparatus and method which are applicable to uses where load demands require plural inverter sources but which is also applicable to all controlled-current inverter motor drives.

The foregoing and other objects are achieved, in accordance with the method and apparatus of the present invention, through the use of a controlled-current motor drive of type having first and second parallel connected inverter circuits supplying a single electric motor load with electrical power of controllable frequency and magnitude. The present invention provides for individually controlling the inverter circuits in response to appropriate input signals representing the desired level of motor operation and further provides for the sensing of when the motor torque requirements are below a predetermined level and above a predetermined speed. In response to this sensing, a signal is provided which indicates the desirability of shifting the mode of system operation and in response to the presence of this mode shifting signal, one of the inverter circuits is rendered ineffective whereby the total power requirements of the motor load are supplied by less than a total of the number of inverters within the overall system.

BRIEF DESCRIPTION OF THE DRAWING

While the present invention is particularly defined in the claims annexed to and forming a part of this specification, a better understanding can be had from the following description taken in conjunction with the accompanying drawing in which:

DETAILED DESCRIPTION

Figure 1:
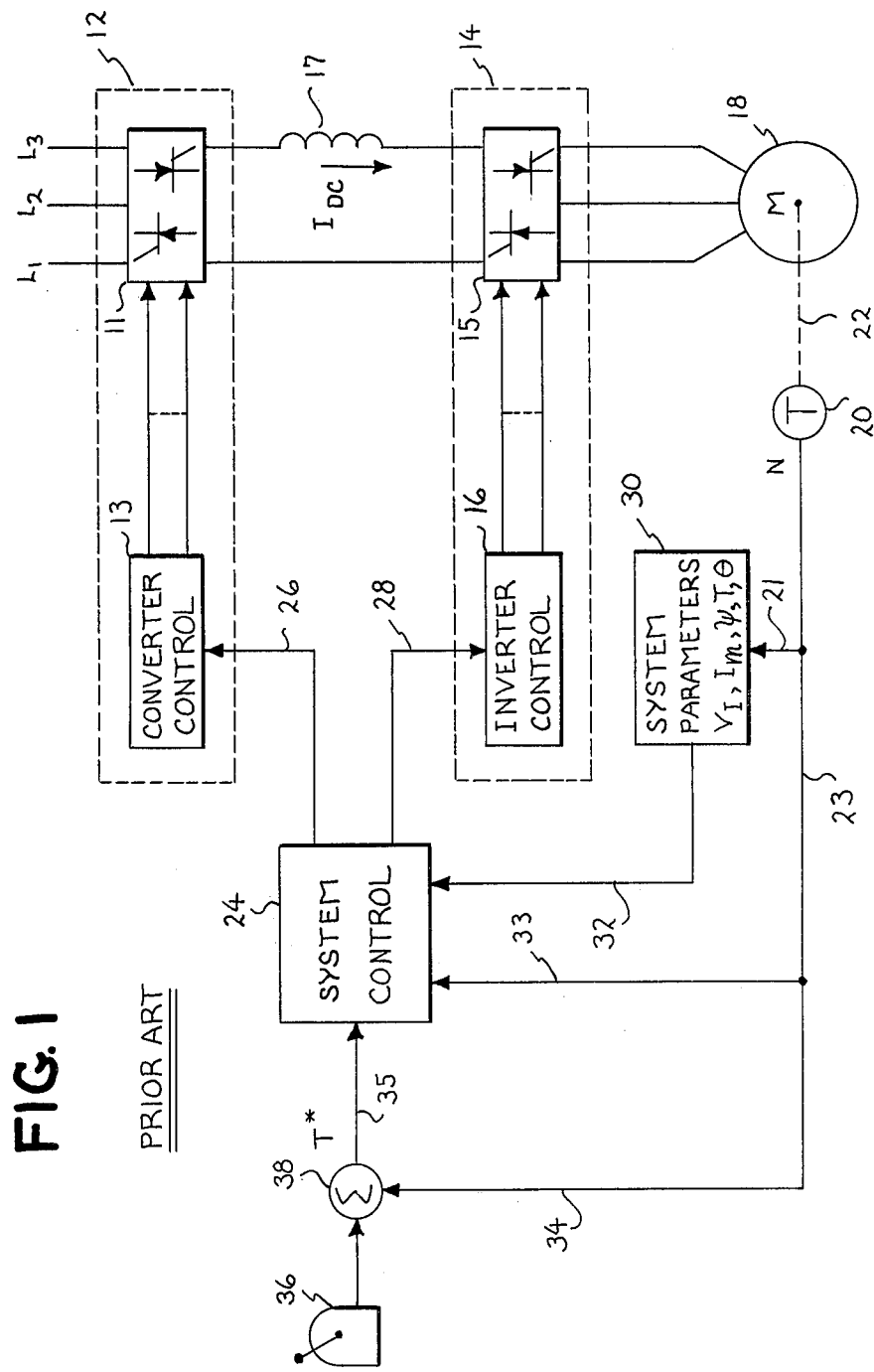
FIG. 1 is a schematic block diagram depicting a typical controlled-current inverter drive system such as is known in the prior art, the understanding of which is helpful in the understanding of the present invention.

Reference is first made to FIG. 1 which shows a typical controlled-current inverter system in accordance with the teachings of the prior art. As shown in FIG. 1, the system includes a source of variable DC current 12 including a converter unit 11 under the control of a suitable control means 13. A current, $I_{DC}$, is supplied from the source 12, by way of a DC link circuit including a suitable filter (e.g., an inductor 17) for smoothing the DC current from the source 12, to a suitable inverter circuit 14 including a converter unit 15 under the control of a converter control means 16. The output of the inverter circuit 14 is supplied to a load shown in FIG. 1 as a motor 18.

The DC source 12 can be any one of a variety of forms such as, for example, a DC chopper whose input terminals are coupled to an uncontrolled DC source. In such case, the control would be of the time ratio type. Source 12 could also include some other means for varying the current eminating from a DC source. More commonly, however, source 12 would be of the type generally illustrated in FIG. 1 in which the conversion unit is a phase controlled multi-leg bridge, for example, a six thyristor bridge, which has its input connected to a three phase AC source as represented by terminals $L_1$, $L_2$ and $L_3$. In this latter situation, the control is of that known type which is synchronized with the line voltage and which, under the control of an input signal, varies the output by varying the firing or conduction angles of the bridge rectifiers in response to input signals to their gate electrodes to thereby vary the source output.

Inverter circuit 14 includes a suitable conversion unit 15 which may also take any suitable form but which most commonly today, as further illustrated in FIG. 2 to be explained later, would also be a six thyristor bridge as known in the art. The operating frequency of the unit 15 is shown to be under the control of an inverter control means 16. One well-known implementation of the control 16 would include a voltage controlled oscillator supplying a ring counter the output signals of which are used to initiate the firing (rendering conductive) of the thyristors of the bridge. In this well-known type of control, the magnitude of the input signal to the voltage controlled oscillator controls the inverter frequency output.

The output of the inverter circuit 14 is supplied as a polyphase input to a suitable motor load 18 which is preferably an AC induction motor. Motor load 18 receives input power at a frequency in accordance with the operation of the inverter conversion unit 15 and of a magnitude corresponding to the magnitude of the DC link circuit current $I_d$.

The rotational speed of motor 18 is sensed by any suitable means such as a tachometer 20 which is illustrated by dashed line 22 as being mechanically connected to the motor armature. The output of tachometer 20, on line 23, is a signal (N) indicative of the motor speed. This signal forms an input to other parts of the drive circuit to be subsequently described.

The overall control of the DC source 12 and inverter circuit 14 is achieved by way of a system control circuit illustrated generically within block 24 which provides signals to the converter control 13 and the inverter control 16 by way, respectively, of lines 26 and 28. The system control 24 receives a plurality of signals including those shown as being delivered from a parameter block 30, by way of line 32, which are indicative of the inverter voltage ($V_I$), the motor current ($I_m$), the flux between the stator and rotor of the motor ($\psi$), the motor torque (T) and the angle between the motor flux and the motor current ($\theta$). Additionally, system control 24 receives the speed signal (N) which appears at the output of tachometer 20 on line 23 by way of line 33.

The system control 24 also receives a torque reference signal (T*) way of line 35 which is the output of a suitable summing junction 38. Inputs to the summing junction 38 are the output of a suitable operatable control indicated generally at 36 which provides an input signal to the summing junction 38 representative of the desired level of operation, for example, the desired speed. The second input to junction, 38 via line 34, is the speed signal (N). That the signal appearing on line 35 is indicative of a desired change in torque is apparent when one realizes that, with respect to speed, the signal from the potentiometer 36 is representative of desired speed and the N signal on that line 34 is representative actual speed and that, if the actual speed is below the desired speed, additional torque will be required to bring the motor up to desired speed.

The system shown in FIG. 1 is that which is known in the prior art and which is described in detail in U.S. Pat. No. 4,230,979, "Controlled Current Inverter and Motor Control System" by P. M. Espelage, et. al, issued Oct. 28, 1980, and assigned to the assignee of the present invention. As to a particular means for generating the $\psi$, T and $\theta$ signals, reference is made to U.S. Pat. No. 4,088,934, "Means for Stabilizing an A-C Motor Drive System" by J. D. D'Atre, et.al, issued May 9, 1978 and also assigned to the assignee of the present invention. The reader is directed to these patents which are specifically incorporated hereinto by reference for a more thorough understanding of the overall system and particularly with respect to the details of that illustrated generally within the system control 24 and the parameter block 30.

Figure 2:
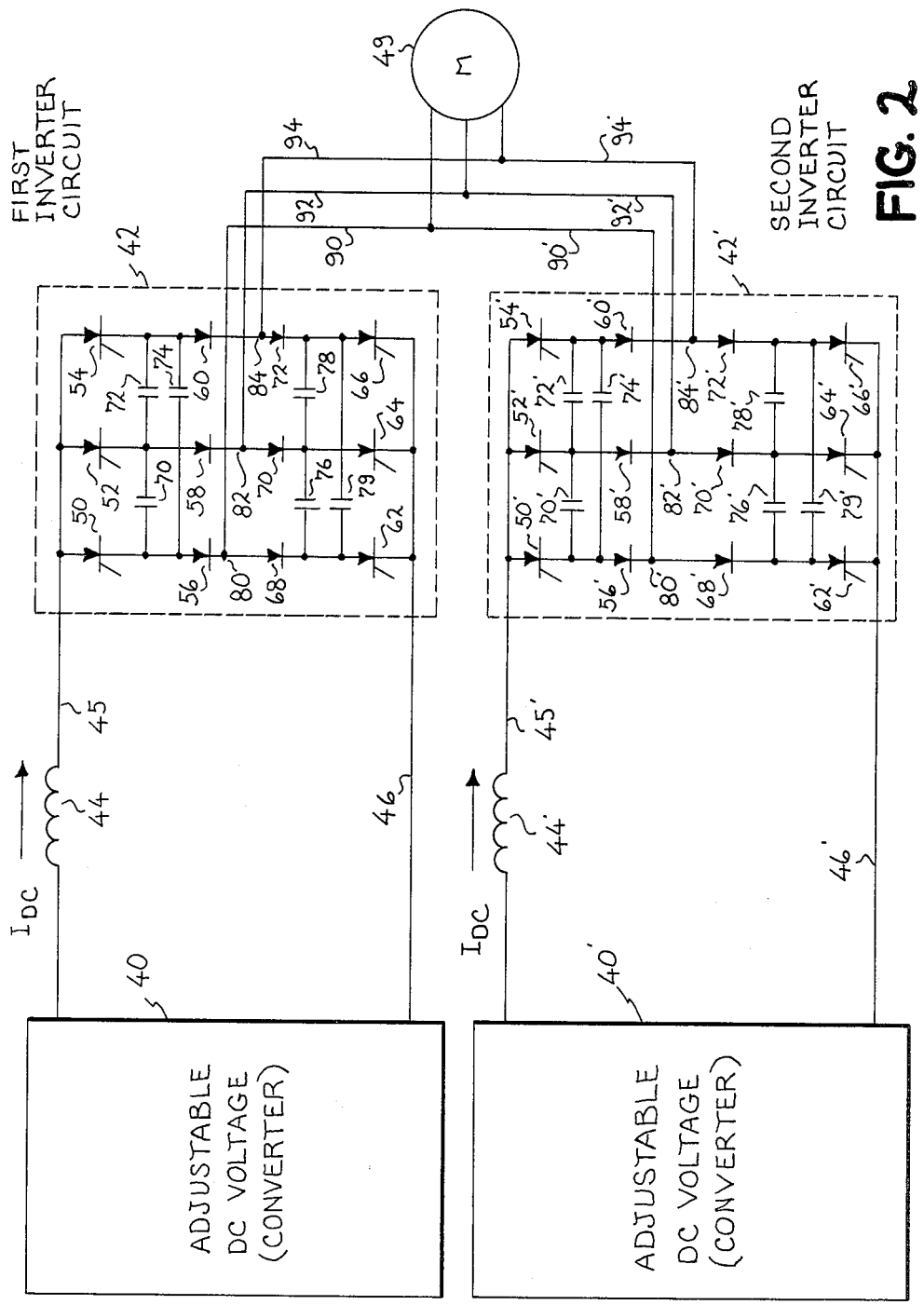
FIG. 2 is a schematic diagram illustrating the supplying of a single motor load using parallel connected controlled-current inverter circuits.

FIG. 2 illustrates a typical scheme in which a plurality, in the present instance two, controlledcurrent inverter circuits are utilized to supply a single motor load. It is believed that the circuitry illustrated by the FIG. 2 depiction is well known to those skilled in the art and the description of this figure will, therefore, be brief. Since the upper and lower inverter circuits are identical in construction, only the upper circuit will be described in detail with the understanding that the lower circuit is substantially identical as indicated by the prime notations. Referencing now FIG. 2, it is seen that an adjustable DC voltage source or converter 40 (e.g., that shown at 12 in FIG. 1) supplies a current, $I_{DC}$, by way of a DC link circuit having buses 45 and 46 and an inductor 44 to a three phase bridge network which comprises the first inverter circuit shown within the dashed line block 42. The output of the first inverter circuit 42 forms one input to a motor load 49 as indicated. Inverter circuit 42 comprises three positive leg controlled rectifiers 50, 52 and 54 which have their anodes connected to bus 45 and their cathodes connected, respectively, to the anodes of three diodes 56, 58 and 60, the cathodes of which are respectively connected to three output nodes 80, 82 and 84. Also connected to the output nodes 80, 82, and 84 are the respective anodes of three diodes 68, 70 and 72 the cathodes of which are connected to the respective anodes of three negative leg controlled rectifiers 62, 64 and 66. The cathodes of these latter three rectifiers are connected to the other DC bus 46.

Suitable commutating capacitors are connected between the thyristors within the inverter circuit. As illustrated in FIG. 2, a commutating capacitor 70 is connected between the cathodes of thryristors 50 and 52 while a second commutating capacitor 72 is connected between the cathodes of thyristors 52 and 54. A third commutating capacitor 74 is connected between the cathodes of thyristors 50 and 54. In a similar manner, commutating capacitors 76, 78 and 79 are connected between the respective anodes of the negative leg thyristors 62, 64 and 66. For sake of simplicity, the gating control to the several thyristors of circuit 42 have not been shown since this is believed well known in the art and is illustrated generally in FIG. 1. The first inverter circuit 42 provides an output from nodes 80, 82 and 84 by way, respectively, of lines 90, 92 and 94 to the motor load 49. In a similar manner, the second inverter circuit 42' provides outputs by way of lines 90', 92' and 94' to the same motor load 49. It is believed that the depiction of FIG. 2 is a type known in the art and further description is unnecessary. It should be noted, however, that as is also well known, the two inverter circuits may be operated in synchronism or may be operated phase displaced one with respect to the other in order to provide power factor control, again a feature which is known in the art. One last point which should be made at this time is that while only "single motors" (49 in FIGS. 2 and 18 in FIG. 1) have been illustrated, that intended to be represented in all cases including the case of FIG. 3 to be discussed, is a motor load generally. This motor load may actually comprise a single motor with a single set of windings, a motor with plural sets of windings or may, alternatively, comprise plural individual motors of either type connected to the outputs of the inverter circuits.

Figure 3:
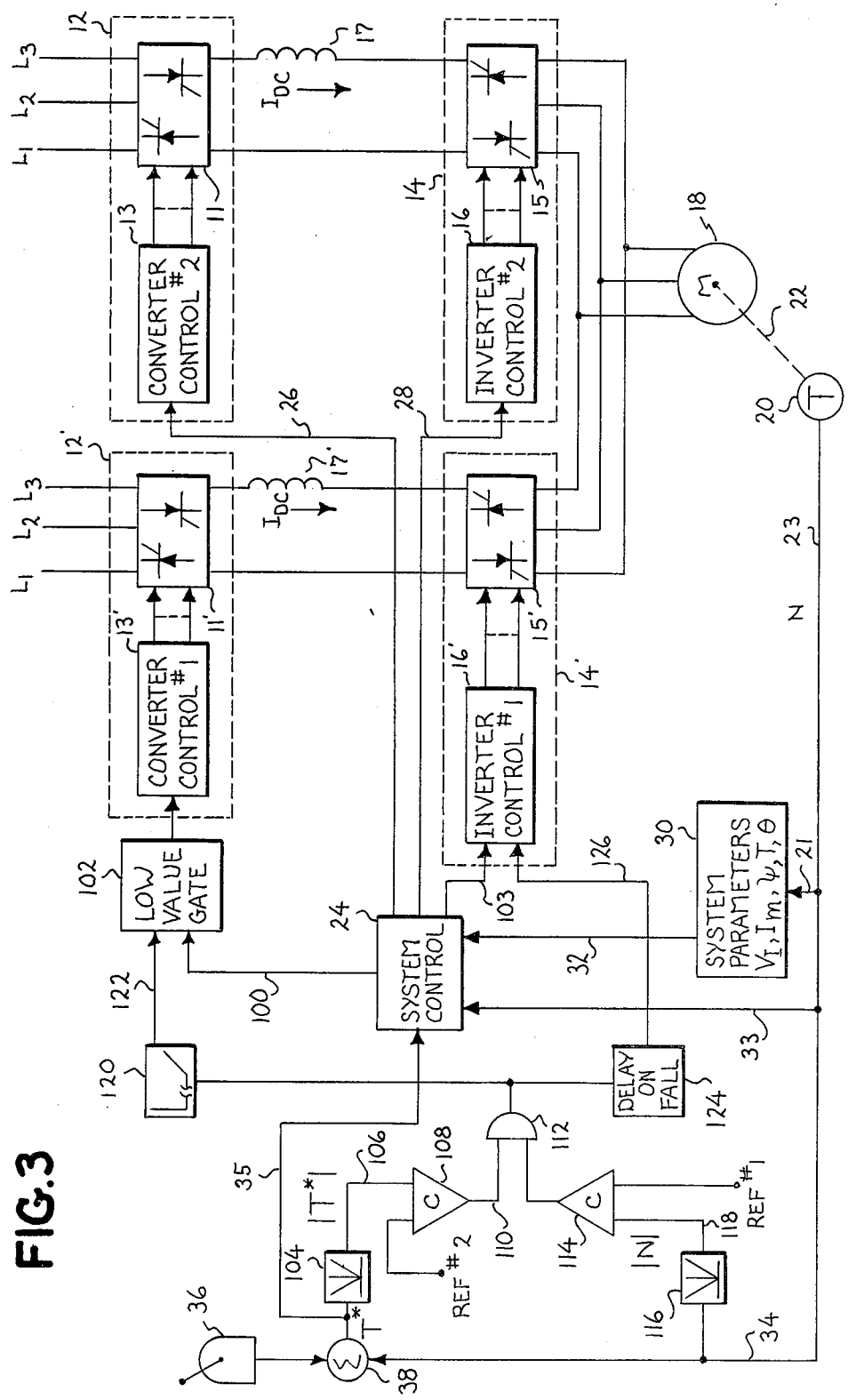
FIG. 3 is a schematic diagram, partially in block form, illustrating the present invention in its preferred embodiment.

Reference is now made to FIG. 3 which illustrates the present invention in its preferred embodiment. It will be immediately obvious that many similarities exist between FIG. 3 and FIG. 1, especially when taken in view the explanation of FIG. 2. As such, reference characters used in FIG. 1 will be used with respect to FIG. 3 to the extent practical. In a manner similar to that employed with respect to FIG. 2, prime notations are also used where identical circuit configurations exist. In FIG. 3, a motor 18 is again supplied with electrical energy from an inverter configuration comprising (as in FIG. 1) a variable DC current source 12 connected by way of a DC link circuit including an inductor 17 to an inverter circuit 14. In the manner described with respect to FIG. 2, a second supply to the motor 18 includes a variable DC voltage source 12' supplying a suitable inverter circuit 14' by way of a DC link 17'. The two inverter circuits may be either synchronously controlled or phased displaced as was discussed with respect to FIG. 2. The motor speed is detected by suitable means such as a tachometer 20 which supplies a speed signal (N) on line 23 which is furnished, via line 21, to the system parameter block 30 and by way of line 33 to the system control 24. Additionally, the speed signal is supplied by way of line 34 to summing junction 38 which further includes an input control signal from a suitable control source 36 such as a potentiometer as earlier described. The output of summing junction 38, a torque reference signal, T*, is furnished by way of line 35 to the system control 24 which provides output signals by way of lines 26 and 28 to a first of a plurality of power sources for the motor in the manner indicated. In this respect, the control of the first power source for motor 18, including the source 12 and the inverter circuit 14, is identical to that earlier described with respect to FIG. 1. In a similar manner, when motor operation is in what might be considered the normal range; that is, significant torque is required at speeds which are not excessive, the system control 24 provides outputs by way of lines 100 and 103 to the converter control 13' and the inverter control 16' to control the second power source for the motor in a manner described with respect to FIG. 2 (i.e., in either a synchronous or a phase displaced mode). It is noted that with respect to the converter control 13' the signal by way of line 100 is applied by way of a low value gate 102 which for the present may be considered to merely pass the signal on line 100 and about which more will be said later.

The present invention finds primary applicably, as was earlier indicated, in those situations in which the motor load 18 is lightly loaded (a low torque and hence a low current requirement) and the speed requirement is high. As explained in the "Background of the Invention", this condition can create serious problems in effective commutation of the thyristors within the inverter circuits 15 and 15'.

As earlier indicated, it is the purpose of the present invention to alleviate this commutation problem by rendering ineffective one of the inverter circuits supplying the motor 18 such that less than a total number of the circuits available to supply the total motor requirements is operative to thus increase the current values in the operating inverter circuits for more efficient commutation. To this end, as shown FIG. 3, the T* signal emanating from the summing junction 38 is supplied to an absolute value circuit 104 such that its output, $|T^*|$, representing the absolute magnitude of the torque reference signal is applied on line 106 as one input to a suitable comparator circuit 108. The second input to comparator 108 is a Reference #2 voltage signal which represents a predetermined minimum torque value. Thus, compartor 108 will provide an output signal (a "reduced torque" signal) on its output 110 when the torque requirement of the system falls below a predetermined value. The reduced torque signal on line 110 forms one input to an AND gate 112. The second input to AND gate 112 is the output (an excess speed signal) of a second comparator 114 which has as one input a Reference #1 voltage signal representing a predetermined motor speed at which commutation problems at light motor loads might begin to occur. The second input to comparator 114 is the output of a second absolute value circuit 116 the input of which is the speed signal, N. As such, the output ($|N|$) of the absolute value circuit 116 represents the absolute speed of the motor without regard to direction of rotation. This signal appears on line 118 as the second input to comparator 114.

The output of AND gate 112 is here termed a mode shift signal since it causes a shift in the mode of system operation and first forms an input to a suitable transfer function block 120 the output of which, as illustrated, will immediately decrease from some high value to a low value when the mode shift signal from AND gate 112 goes, for example, from a binary zero to a binary one. When the mode shift signal goes in the opposite direction, i.e., from a binary one to a binary zero, the output of block 120 will ramp up to some prescribed value. The output of block 120 forms a second input to the low value gate 102 earlier mentioned. Low value gate 102 is of the type which is well known in the art which will pass the lower value of the two input signals applied thereto, in this case the lower of the values applied by way of lines 100 and 122.

The mode shift signal output of AND gate 112 also serves as an input to a function block 124 which provides an output signal corresponding to its input signal, but which provides a delay when the level of the input falls. That is, when the output of gate 112 goes to a binary one, the signal will be immediately passed but when this signal goes from a binary one to a binary zero, the output will be delayed. The output from block 124 is applied by way of line 126 to the inverter control 16' and serves, when in its binary one state, to inhibit the operation of inverter circuit 15' in some suitable way as by removing the gating signals from the thyristors of that circuit.

From the foregoing description, it is seen that AND gate 112 will provide a binary zero output signal so long as the torque signal on line 106 and the speed signal from tachometer 20, which appears on line 34, are respectively above and below predetermined values. When these signals represent opposite requirements; i.e., low torque and high speed, the output of AND gate 112 will be a binary one. As such, when the mode shift output of AND gate 112 goes to a binary one indicating the low torque, high speed performance requirement, the first effect will be for the delay on fall block 124 to pass a binary one signal via line 126 to the inverter control 16' to immediately cause that control to stop gating the thyristors of inverter circuit 15'. At the same time the output from AND gate 112, through transfer block 120, will cause a low value signal on line 122 to be passed by the low value gate 102 to cause the converter control 13' to immediately go into a full negative type of operation to rapidly reduce current ($I_{DC}$) in inductor 17' to zero. Thus, it is seen that when a low torque, high speed mode of operation is required of the motor load 18, the second system represented shown by the prime notation is rendered ineffective and the total power requirements of the motor load 18 will be supplied by the remaining power supplies within the overall system.

When the system torque requirements have increased and/or the speed requirements have decreased and effective commutation of the thyristors of the inactivated systems is possible, the output of AND gate will go to a binary zero. This value of the mode shift signal is applied to the transfer function block 120 and will cause that block to begin to ramp upwardly as indicated. When the signal on line 122 exceeds that on line 100, control of the DC voltage supply 11' will be returned to the system control 24 as before. After a short delay this same binary zero signal from AND gate 112 will be passed through the delay on fall block 124 and will appear on line 26 to thus permit the control of the inverter circuit 141' to be returned to the system control 24 as a function of the control signal on line 103.

In summary, it is seen that when the torque and speed requirements of the the motor load 18 are within prescribed limits, the system control 24 will effect control of the motor from the plurality of supply systems and that when the torque and speed requirements are outside of these prescribed limits less than the total number of systems will be effective.

While there have been shown and described what is at present considered to be the preferred embodiment of the present invention, modifications thereto will readily occur to those skilled in the art. For example, although only two parallel connected motor supplies have been illustrated, it is readily apparent to those skilled in the art that additional supplies could be employed with equal facility and that the supplies could be subquentially rendered ineffective by appropriately scaling reference values corresponding to the reduced torque and excess speed signals. The variation in possible motor loads has been discussed. It is not desired, therefore, that the invention be limited to the specific arrangement shown and described and it is intended to cover in the appended claims all such modifications as fall within the true spirit and scope of the invention.

What is claimed is:

1. A controlled-current motor drive of the type having a plurality inverter circuits connected in parallel for supplying, to a single electric motor load, electric power of controllable frequency and magnitude comprising:
   (a) means for individually controlling said inverter circuits in response to respective input signals representing a desired level of motor operation;
   (b) means for sensing when the motor power requirements are below a predetermined load and above a predetermined speed and to provide a mode shift signal in response to the simultaneous occurrence thereof; and,
   (c) control means responsive to said mode shift signal for rendering less than the total number of said inverter circuits effective during the presence of said mode shift signal whereby the total of the motor power requirements are supplied by less than the total number of said inverter circuits.

2. The invention in accordance with claim 1 wherein said motor drive includes only first and second inverter circuits and wherein said mode shift signal is operative to render only a first of said inverter circuits ineffective.

3. The invention in accordance with claim 1 wherein said control means further responds to the absence of said mode shift signal to permit the total number of said inverter circuits to be operative to supply electrical power to said motor load.

4. A drive system for a polyphase alternating current electric motor load comprising:
   (a) a plurality of parallel connected controlled-current inverter circuits each having a plurality of electrical current conducting legs, each of said legs including a controlled rectifier device and at least one associated commutating capacitor, said inverter circuits collectively operative to supply the motor load with electrical power during a first mode of motor load operation;
   (b) means for supplying each of said inverter circuits with direct current power of variable magnitude;
   (c) means for sensing when said motor load is operating at a speed in excess of a predetermined value and for providing an excess speed signal proportional thereto;
   (d) means for sensing when the required torque output of said motor load is below a predetermined value and for providing a reduced torque signal proportional thereto; and
   (e) means responsive to the simultaneous occurrence of said excess speed signal and said reduced torque signal to provide a mode shift signal effective to render less than the total available number of said inverter circuits effective to supply said motor load with electrical power during a second mode of motor load operation.

5. The invention in accordance with claim 4 wherein the means to provide said mode shift signal further acts to place the drive system in the first mode of operation in the absence of either said excess speed signal or said reduced torque signal.

6. In an alternating current motor control system of the type employing plural individually operable controlled-current inverter circuits, the method of extending speed range of said motor load to higher than normal values at low motor loads comprising the steps;
   (a) supplying electric power to said motor load using said plurality of inverter circuits during a first mode of operation;
   (b) sensing when the torque and speed requirements of the load are collectively such as to place the motor into a potentially unstable mode of operation and providing a mode shift signal in response thereto; and,
   (c) rendering, in response to said mode shift signal, at least one of said inverter circuits ineffective whereby the total power requirements of said motor load are supplied by less than the total available number of inverter circuits in a second mode of operation.

7. The method in accordance with claim 6 wherein the step of sensing and providing comprises the steps:
   (a) sensing when the speed requirement is higher than a predetermined value to develop an excess speed signal;
   (b) sensing when the torque requirement is below a predetermined value to develop a reduced torque signal; and
   (c) providing said mode shift signal in response to the simultaneous occurrence of said excess speed signal and said reduced torque signal.

8. The invention in accordance with claim 6 wherein said motor load is supplied by first and second inverter circuits and wherein, in response to the mode shift signal, the first of the inverter circuits is rendered ineffective whereby the total power requirements of the motor load are supplied by the second of the inverter circuits.

* * * * *